(12) United States Patent
Hartmann

(10) Patent No.: US 11,365,776 B2
(45) Date of Patent: Jun. 21, 2022

(54) DEVICE FOR ACTUATING A BRAKE, BRAKE AND METHOD FOR PRODUCING OR UPGRADING A DEVICE FOR ACTUATING A BRAKE

(71) Applicant: SAF-HOLLAND GmbH, Bessenbach (DE)

(72) Inventor: Mark Hartmann, Sulzbach am Main (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 16/463,739

(22) PCT Filed: Nov. 30, 2017

(86) PCT No.: PCT/EP2017/080990
§ 371 (c)(1),
(2) Date: May 23, 2019

(87) PCT Pub. No.: WO2018/100066
PCT Pub. Date: Jun. 7, 2018

(65) Prior Publication Data
US 2019/0383341 A1    Dec. 19, 2019

(30) Foreign Application Priority Data

Dec. 2, 2016    (DE) .................... 10 2016 123 358.7

(51) Int. Cl.
*F16D 55/08* (2006.01)
*F16D 65/72* (2006.01)
(Continued)

(52) U.S. Cl.
CPC .......... *F16D 65/72* (2013.01); *F16D 2121/02* (2013.01); *F16D 2121/14* (2013.01);
(Continued)

(58) Field of Classification Search
CPC ............. F16D 2125/26; F16D 2125/28; F16D 2125/10; F16D 65/72; F16D 65/74; F16D 65/76
See application file for complete search history.

(56) References Cited

U.S. PATENT DOCUMENTS 3,435,922 A    4/1969    Schmid
3,750,853 A    8/1973    Farr
(Continued)

FOREIGN PATENT DOCUMENTS

CN    1197741 A    11/1998
CN    101326381 A    12/2008
(Continued)

OTHER PUBLICATIONS

European Patent Office, International Search Report, dated Apr. 19, 2018.

*Primary Examiner* — Nicholas J Lane
(74) *Attorney, Agent, or Firm* — Price Heneveld LLP

(57) ABSTRACT

A device for actuating a brake shoe of a brake, in particular a disk brake, includes a pivotably mountable lever element, and a transmission element configured to be mounted in a longitudinally movable fashion is such that a pivot movement of the lever element is translated into a longitudinal movement of the transmission element wherein a hydraulic chamber configured to be filled with a hydraulic fluid is arranged between the brake shoe and the transmission element for the transmission of force between the brake shoe and the transmission element.

20 Claims, 1 Drawing Sheet

(51) Int. Cl.
*F16D 121/02* (2012.01)
*F16D 121/14* (2012.01)
*F16D 123/00* (2012.01)
*F16D 125/10* (2012.01)
*F16D 125/26* (2012.01)
*F16D 125/28* (2012.01)

(52) U.S. Cl.
CPC ...... *F16D 2123/00* (2013.01); *F16D 2125/10* (2013.01); *F16D 2125/26* (2013.01); *F16D 2125/28* (2013.01)

(56) References Cited

U.S. PATENT DOCUMENTS

| | | | |
|---|---|---|---|
| 4,109,765 A * | 8/1978 | Johannesen | F16D 65/18 188/72.7 |
| 4,267,903 A * | 5/1981 | Kita | F16D 55/224 188/196 A |
| 5,462,137 A | 10/1995 | Aubry et al. | |
| 6,044,936 A * | 4/2000 | Matsumoto | F16D 65/18 188/72.4 |
| 6,293,632 B1 * | 9/2001 | Grote | B60T 7/042 188/1.11 E |
| 6,729,445 B1 | 5/2004 | Qian et al. | |
| 7,506,732 B2 * | 3/2009 | Antony | F16D 65/183 188/72.7 |
| 2004/0094375 A1 | 5/2004 | Qian et al. | |
| 2008/0277212 A1 * | 11/2008 | Johansson | F16D 65/567 188/72.5 |
| 2012/0181123 A1 * | 7/2012 | Ruiz | F16D 65/0068 188/72.4 |

FOREIGN PATENT DOCUMENTS

| | | | |
|---|---|---|---|
| CN | 105383629 A | 3/2016 | |
| DE | 2900894 | 7/1979 | |
| DE | 3119921 | 4/1982 | |
| DE | 3629513 | 3/1988 | |
| DE | 102006040328 | 3/2008 | |
| DE | 102015113675 | 3/2016 | |
| DE | 102014221069 | 4/2016 | |
| EP | 2338778 | 11/2010 | |
| GB | 2058973 A * | 4/1981 | ............ F16D 65/74 |
| JP | H08253115 | 10/1996 | |
| KR | 20150069695 | 6/2015 | |
| KR | 20150069695 A | 6/2015 | |

\* cited by examiner

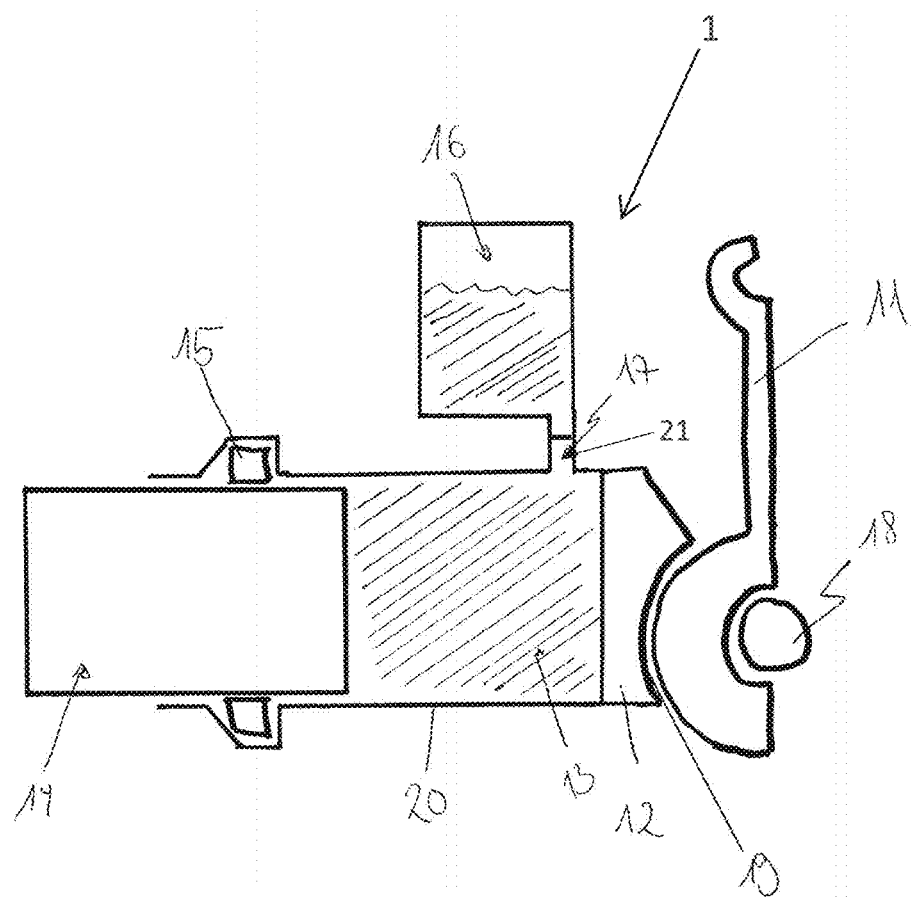

DEVICE FOR ACTUATING A BRAKE, BRAKE AND METHOD FOR PRODUCING OR UPGRADING A DEVICE FOR ACTUATING A BRAKE

BACKGROUND OF THE INVENTION

The present invention concerns a device for actuating a brake, a brake and a method for producing or upgrading a device for actuating a brake.

Devices for actuating a brake, for example in the form of a brake caliper, have been known in the prior art for a long time. Such devices in particular serve to move a brake shoe or its brake pad such that in a braking state, it is pressed with a clamping force against a disk which is connected rotationally fixedly to a wheel, while the brake shoe assumes a free-running state by forming an air gap, i.e. a space between the brake shoe and the disk.

An essential part of the actuation device, in particular the actuation devices used by trucks, is a pivotably mounted lever element, the pivot movement of which caused by the input force applied on actuation is translated into a longitudinal movement. To translate the pivot movement into a longitudinal movement and subsequently transmit the force of the longitudinal movement to the brake shoe or its brake pad, typically numerous individual components are provided which are connected together in a complex fashion. As well as this complicated structure, it has also proved disadvantageous that the air gap can usually only be modified or adjusted with difficulty.

It is therefore an object of the present invention to provide a device for actuating a brake which is configured more simply than the actuation devices known from the prior art, and in which the air gap can be adjusted more easily.

SUMMARY OF THE INVENTION

According to the invention, a device is provided for actuating a brake shoe, in particular the pad backing plate, of a brake, in particular a disk brake, in particular of a truck, comprising a pivotably mountable lever element, and a transmission element which can be mounted in a longitudinally or translationally movable fashion and which is designed such that a pivot movement of the lever element is translated into a longitudinal or translational movement of the transmission element, wherein a hydraulic chamber which can be filled with a hydraulic fluid can be arranged between the brake shoe and the transmission element for the transmission of force between the brake shoe, in particular its pad backing plate, and the transmission element. In comparison with devices from the prior art, with the hydraulic chamber according to the invention, a force transmission can be achieved by which the brake shoe can be transferred into its braking state. Forming the force-transmitting component as a hydraulic chamber not only advantageously reduces the number of components necessary for force transmission, but the air gap can easily be adjusted via a quantity of hydraulic fluid. Furthermore, it is conceivable that the device for actuating a brake shoe is integrated together with the brake shoe in a brake, in particular a disk brake. In particular, it is provided that the lever element and the transmission element are actively connected to each other via a contact face, and that by the design of the contact faces, the pivot movement of the lever element is transferred into a longitudinal or translational movement of the transmission element. It is preferably provided that the contact face of the transmission element bears permanently on the lever element or part of the lever element. It is furthermore conceivable that the hydraulic chamber directly adjoins the transmission element, viewed in a force flow direction running from the transmission element to the brake shoe. In particular, it is provided that the transmission element stands in sealing contact with the hydraulic chamber. Thus the transmission element may be configured as a piston which is translationally displaceable in the hydraulic chamber. A further advantage of the arrangement of the hydraulic chamber is that existing, purely mechanical devices can be upgraded by simple integration of the hydraulic chamber. In particular, it is provided that the device has a pivotably mountable lever element and a transmission element which can be moved longitudinally or translationally, and that the hydraulic chamber is arranged between the brake shoe and the transmission element in the force flow direction between the brake shoe and the transmission element.

According to a further embodiment of the present invention, it is provided that to form the hydraulic chamber, the device has a base body and a cylinder element mounted movably relative to the base body, wherein the cylinder element is or can be connected, in particular rigidly, to the brake shoe. Here, it is provided that the hydraulic chamber has a base body open to one side, via which opening the cylinder element can be introduced or displaced. The cylinder element and the transmission element are in particular separated or spaced from each other such that the hydraulic fluid is arranged between them. Preferably, an end face of the cylinder element protrudes into the base body, and this end face in particular stands in direct contact with the hydraulic fluid of the hydraulic chamber. For the longitudinal movement of the cylinder element, it is preferably provided that the base body, in particular the wall of the base body, is configured in the region of the opening such that the cylinder element is guided by the wall in its longitudinal movement, i.e. the wall serves as a guide rail. To stabilize the cylinder element, the device is configured, in particular dimensioned, such that the cylinder element in braking state fills the base body, which is open towards one side, to at least 30%, preferably at least 50% and particularly preferably at least 60%. It is furthermore conceivable that the brake shoe is arranged on an end face of the cylinder element opposite the end face protruding into the base body.

To avoid thermal stress of the hydraulic fluid, the cylinder element is preferably formed from several pieces. It is also conceivable that the material from which the cylinder element is made is one with a comparatively low coefficient of thermal conductivity, and/or that the base body is configured such that the transmission element and the cylinder element are arranged with a height offset to each other. Such a height offset, because of the form of the base body, allows the device to be configured such that the device can be adapted to the circumstances of the installation space. Preferably, the form of the base body is individually adapted to an intended area of use.

Preferably, a sealing element is arranged between the base body and the cylinder element, wherein the sealing element in particular is designed such that the sealing element loads the cylinder element with a return force. In this way, the sealing element not only seals the hydraulic chamber by means of the sealing element, but the sealing element additionally ensures a return of the cylinder element from the braking position to the free-running position. To generate the desired return force, the sealing element is dimensioned and arranged accordingly. For example, the sealing element is arranged in a rebate which extends peripherally around the inside of the base body. It is conceivable that a contour of the rebate, viewed in a direction running parallel to the force flow, is designed such that on a side facing the hydraulic chamber, the contour of the rebate forms an angle of substantially 90° to the inside of the base body, while on the side facing away from the hydraulic chamber, the contour of the rebate forms an angle of more than 90° to the inside of the base body. In other words, the sides of the rebate have different slopes compared with the remaining course of the inside of the base body in a direction parallel to the force flow direction. Furthermore, it is provided that the sealing element and/or the rebate are dimensioned such that the sealing element arranged in the rebate stands in sealing contact with the inside of the base body.

Suitably, in particular to avoid thermal stress of the hydraulic fluid, the cylinder element is formed from several pieces.

To supply the hydraulic chamber with the hydraulic fluid, it is preferably provided that the hydraulic chamber is fluidically connected to an expansion chamber via a connecting region. The expansion chamber advantageously forms a reservoir which can be used when necessary, or into which hydraulic fluid can be introduced from the hydraulic chamber when necessary. The connecting region may have passage bores in the wall of the base body or connecting channels. It is also conceivable that the expansion chamber has a closable opening via which the hydraulic fluid can be added if required, or via which the hydraulic fluid can be mixed with an additive.

In order to control the exchange between the expansion chamber and the hydraulic chamber, a valve, in particular a check valve, is arranged in the connecting region. Suitably, a check valve is arranged in the connecting region. These check valves, for example together with further passage bores with check valves, ensure that sufficient hydraulic fluid can be drawn from the expansion chamber when the cylinder element is transferred from the position for the free-running state into the position for the braking state, and when the application of force to the lever element ends, the hydraulic fluid can return from the hydraulic chamber to the expansion chamber in order to allow the cylinder element to return into its position for the free-running state.

In a further embodiment of the present invention, it is provided that the transmission element comprises a bearing shell which at least partially receives the lever element.

Preferably, the bearing shell is arranged on an end face of the transmission element, in particular the end facing away from the chamber. The bearing shell thus preferably extends only partially over the end face in a direction running perpendicular to the direction in which the transmission element is translationally moved in operation, i.e. perpendicularly to the force flow direction. In particular, a ratio between a region in which the bearing shell extends along the end face to a total extent of the end face is a ratio of between 0.5 and 0.8, preferably between 0.6 and 0.78, and particularly preferably between 0.65 and 0.75. Furthermore, the bearing shell is configured such that, viewed in a direction in which the longitudinal movement of the transmission element takes place, a first bearing shell end stands opposite a second bearing shell end. Preferably, the first bearing shell end is arranged closer to a center axis which runs centrally through the chamber and is oriented parallel to the longitudinal movement of the transmission element, than the second bearing shell end. In particular, it is provided that the force flow direction runs preferably exclusively parallel to the center axis. In other words, the force flow is not deflected or diverted by the chamber.

For this, the lever element is arranged for example stationarily, preferably on a chassis or vehicle frame, and forms the abutment for the mutually contacting system of lever element and bearing shell. By the design of the lever element and bearing shell, in particular the contact faces of the lever element and bearing shell which roll on or slide past each other on a pivot movement, the transmission element is pressed away from the stationary pivot axis. In particular, the pivot axis is here arranged level with the transmission element.

Preferably, a translation ratio between an input force acting on the lever element and a clamping force applied by the brake shoe is established by the eccentric mounting of the lever element in the bearing shell. Here, it is preferably provided that the translation ratio between the input force and the clamping force is established exclusively by the eccentric mounting, i.e. by the design of the contour paths of the bearing shell and/or the lever element which comes into contact with the bearing shell on a pivot movement of the lever element. In other words, the hydraulic chamber preferably serves solely for force transmission.

Furthermore, it is provided that one end of the lever element is mounted on a pivot axis, wherein the end mounted on the pivot axis engages in the bearing shell of the transmission element for eccentric mounting. In particular, the lever element is configured in the form of a partial ring at the end mounted on the pivot axis. Here it is conceivable that to form the eccentric mounting, a radial extent of the partial ring relative to the pivot axis changes in a circumferential or rotational direction predefined by the pivot movement.

Suitably, a pivot axis about which the lever element is pivotably mounted is arranged below the center axis. In particular, the term "below" here means that the theoretical center axis passes between the end of the lever element mounted on the pivot axis and the opposite end of the lever element, or the theoretical center axis divides the lever element in its longitudinal direction.

It is furthermore provided that the transmission element is arranged between the brake shoe and the lever element or pivot axis in a direction predefined by the translational movement of the transmission element. The pivot axis or lever element, the transmission element and the brake shoe, in particular in this order, may be arranged successively in a direction running parallel to the center axis. In this way, the force can be transferred directly to the brake shoe. In particular, it is provided that the chamber is free from deflection, i.e. the hydraulic fluid is not deflected in the hydraulic chamber.

In particular, the lever element cooperates with only a single transmission element, or causes a movement of only a single brake shoe. For example, the pivot axis is fixed in position. In particular, it is provided that the lever element can control only a single brake shoe. Preferably, it is provided that no brake disk is present between the brake shoe and the lever element. In this way, advantageously, there is no need for a chamber configured such that a fluid channel at least partially surrounds the brake disk and is angled accordingly. Thus a comparatively compact device can be provided for actuating the brake.

Furthermore, it is provided that a distance between the brake shoe and the transmission element has a value of between 1 cm and 15 cm, preferably between 2 cm and 10 cm, and particularly preferably between 3 cm and 8 cm. Preferably, the chamber comprises an inside which has a cross-section in a plane running perpendicularly to the center axis. Preferably, this cross-section remains constant in shape and size in the direction of the center axis.

Suitably, the end of the lever element facing away from the pivot axis is provided to receive the input force. Furthermore, it is preferably provided that the end of the lever element facing away from the pivot axis is provided to receive the input force. Preferably, for this purpose, the end of the lever element facing away from the pivot axis is provided with a contact region via which the input force pivoting the lever element is introduced.

A further subject of the present invention is a brake, in particular a disk brake, in particular of a truck, with a device according to the invention for actuating a brake shoe. All features and advantages described for the device according to the invention can be transferred accordingly to the brake according to the invention and vice versa.

Preferably, the brake comprises a brake disk which is connected rotationally fixedly to a wheel and against which the brake shoe, in particular its brake pad, is pressed with a clamping force in a braking state, while the brake shoe, in particular its brake pad, is spaced away from the brake disk in a free-running state. Particularly preferably, it is provided that the brake disk is arranged in a gap formed by two brake shoes, wherein in the free-running state, the brake disk rotates substantially about an axis which runs parallel to the force flow direction and is predefined by the movement of the transmission element or cylinder element.

Furthermore, the object is achieved by a method for producing or upgrading a device for actuating a brake. All features and advantages described for the device for actuating a brake can be transferred accordingly to the method according to the invention and vice versa.

In this way, the advantages of a hydraulic chamber, in particular with regard to adjustment of the air gap or the number of individual components, can be integrated in an otherwise purely mechanical actuation device. The hydraulic chamber here serves in particular exclusively for force transmission, while an input force is introduced into the device mechanically by the lever element. Here, it is particularly advantageous that the hydraulic chamber can be installed in existing actuation devices without further adaptations.

For this, for example, a cylinder element mounted in the base body of the hydraulic chamber is connected to the brake shoe, and/or a bearing shell is configured to receive part of the lever element in that the bearing shell is adapted to the outside of the part of the lever element engaging in the bearing shell.

BRIEF DESCRIPTION OF THE DRAWINGS

Further advantages and features result from the following description of preferred embodiments of the object according to the invention with reference to the attached FIGURE. Individual features of individual embodiments may be combined with each other in the context of the invention.

The drawings show:

FIG. 1 shows a device for actuating a brake device according to a preferred embodiment of the present invention.

DETAILED DESCRIPTION OF THE PREFERRED EMBODIMENTS

FIG. 1 shows diagrammatically a device 1 for actuating a brake. In particular, this is a device for a disk brake, the disk of which is connected rotationally fixedly to a wheel and is brought into active connection with a brake shoe, preferably two opposing brake shoes, for braking. In a braking state, a clamping force is applied to the disk by the brake shoe, while the brake shoe is spaced from the disk in a free-running state, forming a space or air gap. An essential element of the device for actuating the brake is a pivotably mounted lever element 11 which, to assume the braking state, is loaded with an input force and pivoted as a result of being loaded with the input force. For this, one end of the lever element 11 is preferably mounted on a pivot axis 18. In order to keep the installation space used by the device 1 to a minimum, it is conceivable that the lever element 11 only partially surrounds the pivot axis 18, i.e. in the manner of a claw. To translate the pivot movement of the lever element 11 into a longitudinal movement of the brake shoe, a transmission element 12 is provided which comes into active connection with the lever element 11, in particular the end of the lever element 11 mounted on the pivot axis. Preferably, the transmission element 12 comprises a bearing shell 19 which at least partially receives the lever element 11. The lever element 11, in particular the part of the lever element 11 engaging in the bearing shell 19, and/or the bearing shell 19 are preferably configured such that the lever element 11 is mounted eccentrically in the bearing shell 19. For example, this eccentric mounting is achieved by corresponding contour paths of the bearing shell 19 and of the outer faces of the lever element 11 which come into active connection on pivoting of the lever element 11. Due to the eccentric mounting, on a rotary movement of the part mounted in the bearing shell 19, the transmission element 12 is pressed away from the pivot axis 18 which is preferably arranged stationarily and level with the transmission element 12.

To reduce the complexity of the devices 1 provided for actuating a brake, and for simpler adjustment of an air gap, it is provided that a hydraulic chamber 13 is arranged between the transmission element 12 and the brake shoe in order to transmit force to the brake shoe. In particular, for this it is provided that the transmission element 12 seals the hydraulic chamber 13 on one side. Here, it is conceivable that the transmission element 12 is mounted so as to be longitudinally movable in the hydraulic chamber 13, or the transmission element 12 is mounted so as to be longitudinally movable together with the hydraulic chamber 13. The hydraulic chamber, which is filled with a hydraulic fluid in operation, comprises a base body 20 which is delimited on one side by the transmission element 12 and on the opposite side by a cylinder element 14 which is mounted so as to be longitudinally movable in the base body 20. In operation, the hydraulic chamber 13 is filled with the hydraulic fluid which is compressed on actuation of the device 1 and transmits a force to the cylinder element 14 which is arranged to be longitudinally movable in the base body 20. Here, the longitudinal movement of the transmission element 12 and the longitudinal movement of the cylinder element 14 run in the same direction or are oriented parallel to each other. The cylinder element 14 itself is rigidly connected to the brake shoe (not shown here). In order to return the cylinder element 14 from a position assumed in the braking state, in which it is extended from the base body 20, into a position assumed in the free-running state, in which it is retracted into the base body, the device 1 comprises a sealing element 15. The sealing element 15 is arranged between the cylinder element 14 and the base body 20, in particular between an outside of the cylinder element 14 and an inside of the base body 20. Preferably, the sealing element 15 runs peripherally around the outside of the cylinder element 14 and is let into a rebate of a base body wall. In particular, the sealing element 15 is configured, for example in its shape and/or arrangement, such that a return force is exerted on the cylinder element 14, wherein the return force ensures a return of the cylinder element 14 and hence of the brake shoe from its position assumed in the braking state into its position assumed in the free-running state. The position assumed in the free-running state and hence the air gap can be controlled or adjusted by the fill level or fill quantity of the hydraulic fluid in the hydraulic chamber 13. For adequate and controllable supply of hydraulic fluid to the hydraulic chamber 13, an expansion chamber 16 is provided which is fluidically connected to the hydraulic chamber 13 via a connecting region 17. For this, it is preferably provided that, to control the hydraulic fluid exchange, the connecting region 17 comprises a valve 21, in particular a check valve. It is conceivable that the connecting region 17 is configured as an outlet or inlet, or as a passage bore in the base body 20. Furthermore, several further passage bores may be provided with check valves which ensure that, on a forward stroke or transfer of the cylinder element 14 from the position assumed in the free-running state into a position assumed in the braking state, an adequate quantity of hydraulic fluid can be extracted from the expansion chamber 16, and after termination of the actuation, i.e. after the elimination of the input force acting on the lever element, a corresponding quantity of hydraulic fluid can escape back to the expansion chamber 16 so that the cylinder element 14 resumes the position provided for the cylinder element 14 in the free-running state.

List of Reference Signs

1 Device
11 Lever element
12 Transmission element
13 Hydraulic chamber
14 Cylinder element
15 Sealing element
16 Expansion chamber
17 Connecting region
18 Pivot axis
19 Bearing shell
20 Base body
21 Check valve

The invention claimed is:

1. A truck brake shoe actuation device of a brake, comprising:
   a pivotably mountable lever element;
   an actuator configured to actuate the lever element;
   a transmission element configured to be longitudinally movable and such that a pivot movement of the lever element is translated into a longitudinal movement of the transmission element;
   wherein a hydraulic chamber configured to be filled with a hydraulic fluid is located at least partially directly between a brake shoe and the transmission element for the transmission of force between the brake shoe and the transmission element;
   wherein the transmission element comprises a bearing shell which at least partially receives the lever element; and
   wherein the transmission element is located on an opposite side of the lever element from the actuator;
   a base body;
   a cylinder element mounted movably relative to the base body, wherein the base body and the cylinder element cooperate to form the hydraulic chamber, and wherein the cylinder element includes multiple pieces; and
   a sealing element arranged between the base body and the cylinder element, wherein the sealing arrangement is arranged within a rebate extending around an inside of the base body, and wherein a circumferential wall of the base body has an inclined surface.

2. The truck brake shoe actuation device as claimed in claim 1, wherein the cylinder element is configured to be rigidly connected to the brake shoe.

3. The truck brake shoe actuation device as claimed in claim 2, wherein the sealing element is configured such that the cylinder element is loaded with a return force.

4. The truck brake shoe actuation device as claimed in claim 3, wherein for the supply of hydraulic fluid, the hydraulic chamber is fluidically connected to an expansion chamber via a connecting region.

5. The truck brake shoe actuation device as claimed in claim 4, wherein a check valve is arranged in the connecting region.

6. The truck brake shoe actuation device as claimed in claim 4, wherein the bearing shell and the lever element are mounted eccentrically relative to each other.

7. The truck brake shoe actuation device as claimed in claim 5, wherein the device is configured such that a translation ratio between an input force acting on the lever element and a clamping force applied by the brake shoe is established by the eccentric mounting of the lever element in the bearing shell.

8. The truck brake shoe actuation device as claimed in claim 7, wherein one end of the lever element is mounted on a pivot axis, and wherein the end of the lever element mounted on the pivot axis engages in the bearing shell of the transmission element for eccentric mounting.

9. The truck brake shoe actuation device as claimed in claim 6, wherein an end of the lever element facing away from the pivot axis is configured to receive an input force from the actuator.

10. The truck brake shoe actuation device as claimed in claim 1, wherein the cylinder element comprises a single piece.

11. The truck brake shoe actuation device as claimed in claim 1, wherein for the supply of hydraulic fluid, the hydraulic chamber is fluidically connected to an expansion chamber via a connecting region.

12. The truck brake shoe actuation device as claimed in claim 11, wherein a check valve is arranged in the connecting region.

13. The truck brake shoe actuation device as claimed in claim 12, wherein the device is configured such that a translation ratio between an input force acting on the lever element and a clamping force applied by the brake shoe is established by an eccentric mounting of the lever element in the bearing shell.

14. The truck brake shoe actuation device as claimed in claim 12, wherein the bearing shell and the lever element are mounted eccentrically relative to each other.

15. The truck brake shoe actuation device as claimed in claim 14, wherein an end of the lever element facing away from the pivot axis is configured to receive an input force from the actuator.

16. The truck brake shoe actuation device as claimed in claim 1, wherein one end of the lever element is mounted on a pivot axis, and wherein the end of the lever element mounted on the pivot axis engages in the bearing shell of the transmission element for eccentric mounting.

17. A disk brake that includes a truck brake shoe actuation device as claimed in claim 1.

18. The truck brake shoe of claim 1, wherein the one end of the lever element is mounted to the base body on a pivot axis.

19. A method for production or upgrading of a truck brake, comprising:
- providing a hydraulic chamber filled with hydraulic fluid between a lever element and a brake shoe;
- providing an actuator configured to actuate the lever element;
- providing a transmission element that is configured to be mounted in a longitudinally movable fashion and such that a pivot movement of the lever element is translated into a longitudinal movement of the transmission element, wherein the transmission element comprises a bearing shell which at least partially receives the lever element; and
- wherein the transmission element is located on an opposite side of the lever element from the actuator;
- providing a base body;
- providing a cylinder element mounted movably relative to the base body, wherein the base body and the cylinder element cooperate to form the hydraulic chamber, and wherein the cylinder element includes multiple pieces; and
- providing a sealing arrangement arranged between the base body and the cylinder element, wherein the sealing arrangement is arranged within a rebate extending around an inside of the base body, and wherein a circumferential wall of the base body has an inclined surface.

20. The method as claimed in claim 19, wherein the lever element is configured to remain stationary along a length of the base body as the transmission element moves along the length of the base body.

* * * * *